United States Patent
Alessi et al.

(10) Patent No.: US 7,624,907 B2
(45) Date of Patent: Dec. 1, 2009

(54) LINEAR FRICTION WELDING APPARATUS AND METHOD

(75) Inventors: Salvatore Alessi, Matthews, NC (US); Larry Alexander Polen, Matthews, NC (US); Neil Daly, Matthews, NC (US)

(73) Assignee: Cyril Bath Company, Monroe, NC (US)

( * ) Notice: Subject to any disclaimer, the term of this patent is extended or adjusted under 35 U.S.C. 154(b) by 0 days.

(21) Appl. No.: 12/127,868

(22) Filed: May 28, 2008

(65) Prior Publication Data

US 2008/0308611 A1 Dec. 18, 2008

Related U.S. Application Data

(60) Provisional application No. 60/944,295, filed on Jun. 15, 2007.

(51) Int. Cl.
*B23K 20/12* (2006.01)
*B29C 65/06* (2006.01)

(52) U.S. Cl. .............. 228/112.1; 228/2.1; 156/73.5

(58) Field of Classification Search .......... 228/112.1, 228/2.1; 156/73.5
See application file for complete search history.

(56) References Cited

U.S. PATENT DOCUMENTS

| | | | |
|---|---|---|---|
| 4,154,641 A * | 5/1979 | Hotton | 156/580 |
| 4,352,711 A | 10/1982 | Toth | |
| 4,377,428 A | 3/1983 | Toth | |
| 4,757,932 A * | 7/1988 | Benn et al. | 228/2.3 |
| 4,844,320 A * | 7/1989 | Stokes et al. | 228/102 |
| 4,936,502 A * | 6/1990 | Schlarb et al. | 228/102 |
| 5,682,677 A * | 11/1997 | Mahoney | 29/894.35 |
| 5,813,593 A | 9/1998 | Galaske, Jr. | |
| 5,826,407 A * | 10/1998 | Giacomelli et al. | 53/477 |
| 5,849,146 A * | 12/1998 | Searle et al. | 156/580 |
| 5,853,119 A * | 12/1998 | Searle | 228/112.1 |
| 6,003,752 A | 12/1999 | Searle et al. | |
| 6,095,402 A * | 8/2000 | Brownell et al. | 228/112.1 |
| 6,102,272 A * | 8/2000 | Searle et al. | 228/2.1 |
| 6,354,482 B1 * | 3/2002 | Diebold et al. | 228/112.1 |
| 6,669,075 B2 | 12/2003 | Colligan | |
| 6,730,182 B2 * | 5/2004 | Yamazaki et al. | 156/73.5 |
| 6,779,708 B2 * | 8/2004 | Slattery | 228/112.1 |
| 6,824,040 B2 * | 11/2004 | Honeck et al. | 228/110.1 |
| 6,862,860 B2 | 3/2005 | Aota et al. | |
| 6,910,616 B2 * | 6/2005 | Halley et al. | 228/112.1 |
| 7,083,076 B2 * | 8/2006 | Slattery | 228/2.3 |
| 7,210,610 B2 | 5/2007 | Nelson et al. | |

(Continued)

FOREIGN PATENT DOCUMENTS

GB 2250837 A * 6/1992

*Primary Examiner*—Jessica L. Ward
*Assistant Examiner*—Carlos Gamino
(74) *Attorney, Agent, or Firm*—Adams Intellectual Property Law

(57) ABSTRACT

A linear friction welding head apparatus for dual axis forging, the apparatus including three sets of orthogonal actuators for providing X-, Y-, and Z-planes of apparatus movement for providing Y-axis oscillation, a first forge load along a first forge axis, and a second forge load along a second forge axis. A method for dual axis forging for welding including providing a welding head for applying first and second forge loads along X- and Z-forge axes to weld at more than one interface. The forge loads may be applied at right angles to each other and have magnitudes corresponding to weld interface length.

7 Claims, 12 Drawing Sheets

U.S. PATENT DOCUMENTS

| | | |
|---|---|---|
| 7,225,967 B2 | 6/2007 | Slattery |
| 7,353,978 B2 | 4/2008 | Slattery et al. |
| 7,416,393 B2 * | 8/2008 | Richter .................... 416/213 R |
| 7,431,194 B2 * | 10/2008 | Slattery .................... 228/112.1 |
| 2004/0112941 A1 | 6/2004 | Slattery |
| 2004/0195290 A1 | 10/2004 | Nagao |
| 2007/0084905 A1 * | 4/2007 | Slattery et al. ............ 228/112.1 |
| 2008/0185420 A1 * | 8/2008 | Swallow et al. ............. 228/125 |

* cited by examiner

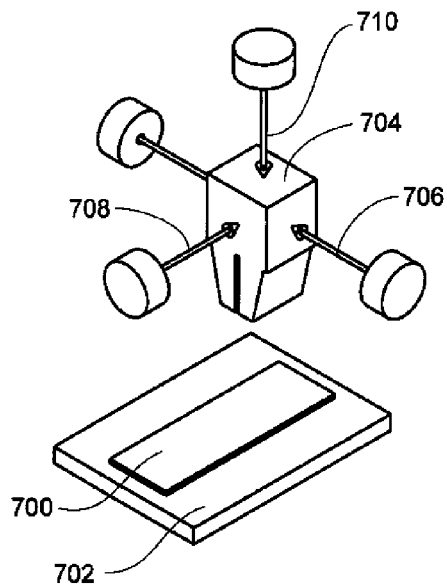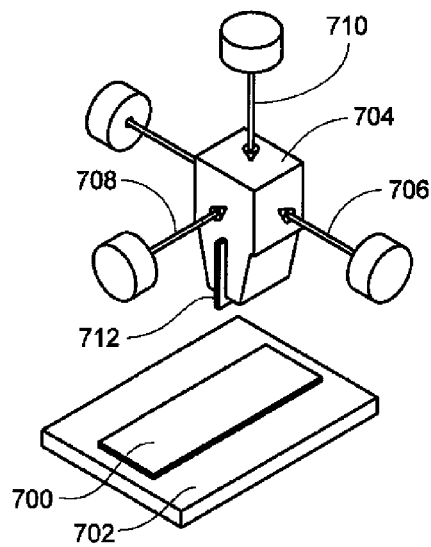
Fig. 7A
Fig. 7B
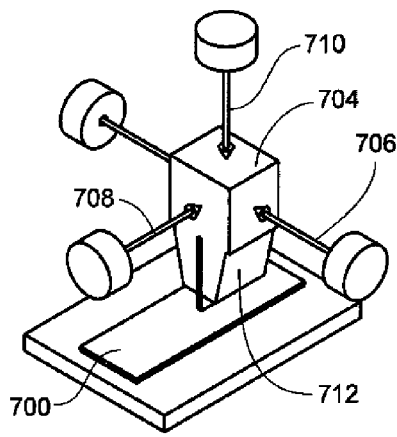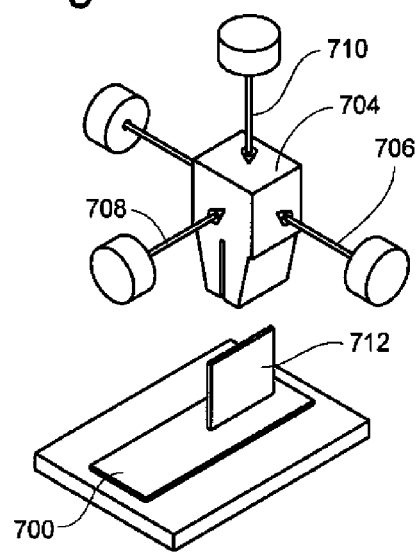
Fig. 7C
Fig. 7D
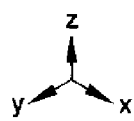

LINEAR FRICTION WELDING APPARATUS AND METHOD

TECHNICAL FIELD AND BACKGROUND OF THE INVENTION

1. Field of the Invention

The present invention relates generally to the field of linear friction welding, and in particular, to apparatus and methods for dual axis forging for linear friction welding machines.

2. Description of the Related Art

Linear Friction Welding is a solid-state process of jointing similar or dissimilar metals that results in desirable microstructures in the weld and in the heat affected zones, producing minimal component distortion and high strength welds. In addition, linear friction welding is also a self-cleaning process, in that the oscillating motion of the process causes surface irregularities and contaminants to be expelled as flash generated during the weld, eliminating production steps.

As implied by its name, linear friction welding involves heating the parts to be welded by friction generated in a controlled manner by the oscillation of the parts relative to each other. In addition to the oscillation, the parts are forced together under a controlled load applied perpendicular to the surfaces in contact, referred to herein as the "forge load." Referring to prior art FIG. 8, in the process, the base part 800 is typically held stationary while part 802 to be welded to the base part is oscillated along oscillation axis 804. With the forge load 806 applied, the oscillation motion causes the parts to heat at the rubbing surfaces 808 to a welding temperature below that of the melting point of the material being welded. The localized heating causes the material to reach a predetermined temperature where the material assumes a "plastic state." While the adjacent materials are in their plastic state, the oscillation motion is stopped and the forge loading force is increased in a forging movement to force the two parts together. Once together, the forge load is held until the part cools, and eventually reduced to zero, completing the weld cycle.

Welds produced by linear friction welding have been shown to be structurally sound and of high quality. Materials such as Titanium that cannot be easily welded by conventional means can be successfully welded using this process. For this reason, parts welded in this manner are particularly desirable in applications where a high degree of structural integrity combined with minimum weight is required, such as in aviation.

Linear friction welding machines and processes are in development that can create Near Net Shape (NNS) Structures that can be machined to produce finished parts. This method of assembling a structure close to a finished part reduces the amount of material and machining time required to produce the final part, thereby greatly reducing part production costs. Conventional linear friction welding machines capable of creating near net shape structures presently utilize a forge load along a single forge axis to accomplish the weld, which is suitable when welding simple, discrete, two plate perpendicular welded structures where load control at the weld interface can be accurately controlled.

When sequential plate part welding or welding at more than one plane of contact is desired, linear friction welding processes utilizing a single forge axis to accomplish the weld present substantial disadvantages. Referring to prior art FIG. 9, part 902 is shown being welded to base part 900 at both base plate weld 904 and angled weld interface 906, which are welded simultaneously. Heat is generated through controlled friction that occurs along oscillation plane 908. Current processes include a forge load applied along a single forge axis 910, which may be positioned perpendicular relative to one of the weld interfaces 904 and 906, or at a predetermined angle relative to the weld interfaces in the plane of the forge axis 910. Since the forge load control is only in one axis, the forge load required to make the two plane weld is a compromise between producing a resultant forge load adequate to weld the angled weld interface 906, and sufficient to make the base plate weld 904.

In this regard, what is desired when making a simultaneous two-plane weld is an apparatus and method that provides an additional forge axis for improving welding performance and extending the welding capabilities of a linear friction welding machine. By providing a second forge axis, the need for angle contact between plates is eliminated and the precise control of the forge load in the second axis is achieved. Further, by adding a second forge axis along which an additional forge load is applied acting at an angle relative to the first forge axis, an order of magnitude of control is added to the linear friction welding process to improve welding performance.

BRIEF SUMMARY OF THE INVENTION

Accordingly, it is an object of the present invention to provide linear friction welding apparatus and methods for simultaneously welding in more than one plane of contact.

It is another object of the invention to provide linear friction welding apparatus and methods for producing high strength welds with minimal component distortion.

It is a further object of the invention to provide linear friction welding apparatus and methods for improving control of the welding process.

It is a further object of the invention to provide apparatus and methods that expand the capabilities of a linear friction welding machine.

It is a further object of the invention to provide apparatus and methods for dual forge axis control that provides forge loading to be accurately applied to parts with weld surfaces that are not perpendicular to the plane of the forge axis.

To achieve the foregoing and other objects and advantages, and in accordance with the purposes of the invention as embodied and broadly described herein, the present invention provides apparatus and methods for linear friction welding utilizing dual axis forging. In one embodiment, the present invention provides a linear friction welding apparatus including: an oscillation block; at least one Y-axis oscillation actuator supported on opposing lateral sides of the oscillation block; at least one Z-axis forge actuator supported by the oscillation block for providing a first forge load along a first forge axis; and at least one X-axis forge actuator supported by the oscillation block for providing a second forge load along a second forge axis; wherein the first forge axis and the second forge axis are at differing angles in relation to each other. The apparatus may further include at least one X-axis counter-load actuator supported by the oscillation block for countering the second forge load provided by the at least one X-axis forge actuator and at least one Z-axis counter-load floating cylinder supported by the oscillation block for countering the first forge load provided by the at least one Z-axis forge actuator.

The oscillation block is maintained between the at least one Y-axis oscillation actuators, the at least one forge and the at least one counter-load actuators in the X-axis, and the at least one forge actuators and the at least one counter load cylinders in the Z-axis. The apparatus may further include a clamping tool for clamping the part to be oscillated with respect to a base part. The actuators may be hydrostatic bearing actuators.

In another embodiment, the present invention provides a linear friction welding apparatus including: a welding head apparatus including three sets of orthogonal actuators for providing X-, Y-, and Z-planes of welding head apparatus movement for providing Y-axis oscillation, a first forge load along a first forge axis, and a second forge load along a second forge axis; a welding table assembly; a part table movable in an X-axis direction; a gantry assembly for providing Z-axis movement, wherein the gantry assembly supports a welding head carriage for providing Y-axis movement and supporting the welding head; and a control console for controlling the operation of the linear friction welding apparatus. The apparatus may further include a flash removal system among other components.

In yet another embodiment, the present invention provides a method for dual axis forging linear friction welding. The method includes: providing a linear friction welding apparatus comprising a welding head apparatus including three sets of orthogonal actuators for providing X-, Y-, and Z-planes of welding head apparatus movement for providing Y-axis oscillation, a first forge load along a Z-axis forge axis, and a second forge load along an X-axis forge axis; providing a base plate; providing a part to be welded to the base plate at a first weld interface and a second weld interface; applying the first forge load at an angle relative to the first weld interface and the second forge load at an angle relative to the second weld interface, the first and second forge loads having predetermined magnitudes; oscillating the part along the Y-axis at a predetermined oscillation amplitude to heat the part and the base plate; reducing the oscillation amplitude to zero; increasing the first and second forge loads to predetermined set-points and maintaining for a predetermined period of time; and reducing the first and second forge loads to zero.

The angle of the first forge load relative to the first weld interface and the angle of the second forge load relative to the second weld interface range from zero to ninety degrees, and are preferably substantially perpendicular. The amplitudes of the first and second forge loads correspond to the length of the weld interface. The X- and Z-forge axes act at right angles to each other. The method may further include monitoring material displacement during welding to determine when to reduce the oscillation amplitude to zero, and monitoring and recording forge displacement.

BRIEF DESCRIPTION OF THE DRAWINGS

These and other features, aspects and advantages of the present invention are better understood when the following detailed description of the invention is read with reference to the accompanying drawings, in which:

FIGS. 7A-7H are views of a simplified schematic sequence of operation of a linear friction welding machine in operation;

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
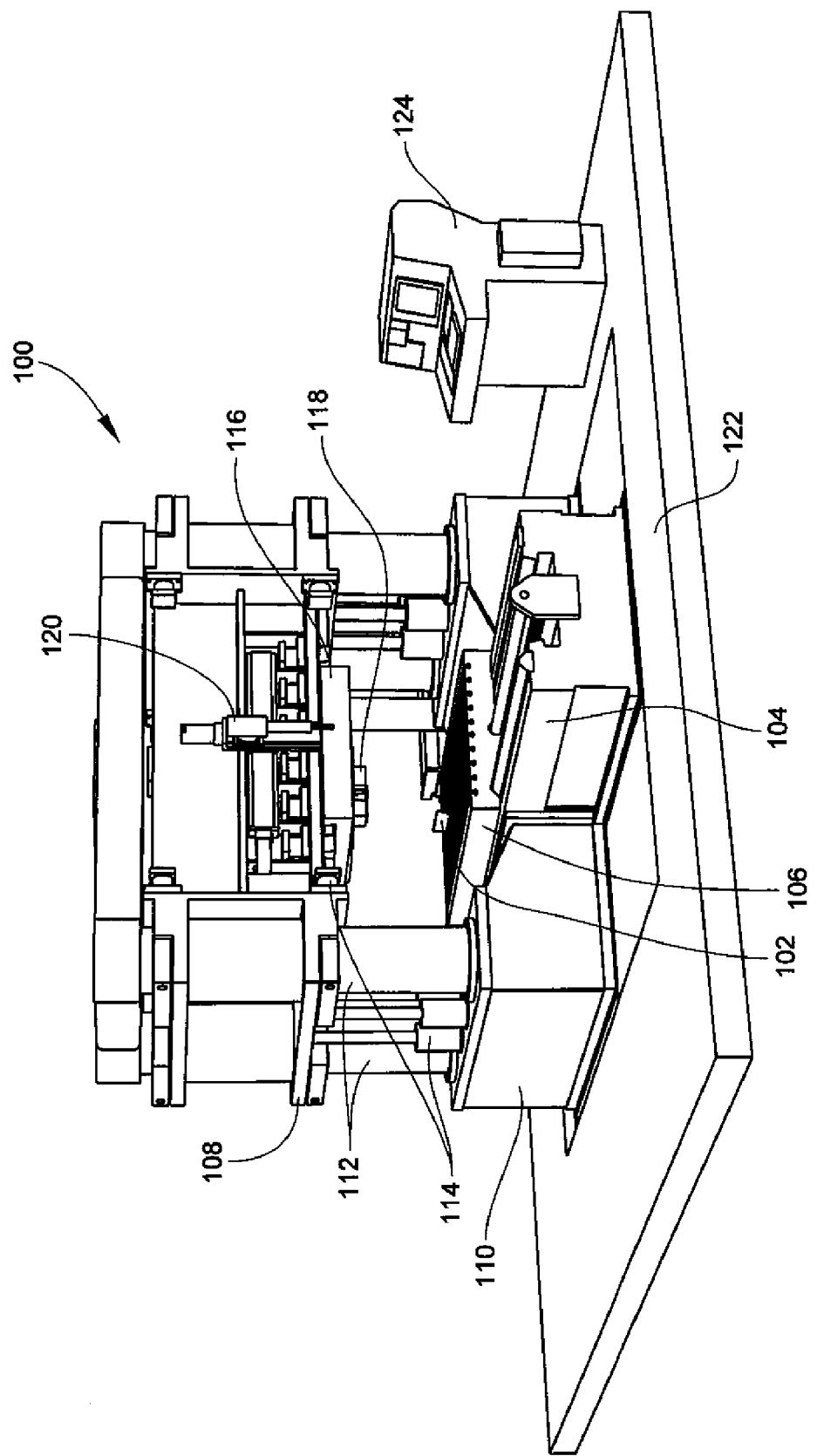
FIG. 1 is a perspective view of a linear friction welding apparatus including a dual axis forging feature.

Referring to FIG. 1, an overall view of a linear friction welding machine including a dual axis forging feature according to one embodiment of the present invention is shown generally at 100. While a specific embodiment of a linear friction welding machine and some of its components are shown and described herein, it should be understood that various modifications can be made to the machine and its design without departing from the scope of the invention. The machine is operable for linear friction welding at least one part 102 to another part, such as a base plate. The machine includes a welding table assembly 104 that provides a surface for mounting the base plate structure. A part table 106 rides on a vee and flat-ways providing X-axis travel for the table. The part table and welding table assembly are constructed to withstand the loading forces of the welding process. The assembly 104 further includes a hydraulic locking system for fixing the part table 106 in position for welding.

A gantry slide assembly 108 provides Z-axis movement for the apparatus. The assembly 108 mounts to gantry supports 110 on each side of the welding table support base that supports multiple large diameter slide columns 112. The gantry includes Z-position dual locks 114. The gantry assembly 108 further supports a welding head carriage 116 that provides Y-axis travel and positioning and includes a hydraulic lock system. The welding head carriage 116 maintains the welding head 118 and a flash removal system 120. The entire machine is supported by a machine base 122. The machine 100 is controlled at a dedicated control console 124 including an operator interface and computer system for apparatus control, data acquisition, manual and automatic functions. The control console further includes controls for motors, hydraulic power units and safety devices. Control equipment may further include motor starters, drive controllers, power conditioning, overload protection and power disconnects.

In one embodiment, a control system of the present invention may include a computer system used in conjunction with the apparatus. The control system is operable for data acquisition of welding parameters in real-time. The control system records welding parameters and data as the machine is running, and uses the data to determine if the weld was done properly. The computer system may conventionally include a processor for executing program instructions stored in a memory. The memory stores instructions and data for execution by the processor, including instructions and data for performing the methods described above. Depending on the extent of software implementation in the computer system, the memory may store executable code when in operation. The memory includes, for example, banks of read-only memory (ROM), dynamic random access memory (DRAM) as well as high-speed cache memory. The operating system provides a software platform upon which application programs may execute, in a manner readily understood by those skilled in the art. The computer system may incorporate any combination of additional devices including, but not limited to, a mass storage device, one or more peripheral devices, remote connections, one or more input devices, one or more portable storage medium drives, a display and one or more output devices. The various components are connected via an appropriate bus as known by those skilled in the art. The storage device stores client and server information, code for carrying out methods in accordance with exemplary embodiments of the invention, and computer instructions for processor. Peripheral devices may include, but are not limited to, any type of computer support device, such as an input/output (I/O) interface, to add functionality to the control system.

The flash removal system 120 functions to remove the flash produced by the welding process prior to welding the next plate. The system 120 may include a two-axis machining head including a Y-axis machine slide, Z-axis machine slide, a self-contained motor driven spindle head with tooling chuck and electric servo ball screw drives for each slide axis. The system 120 is shown mounted to the front side of the gantry frame. The welding table provides the X-axis travel and positioning. The flash removal system controls are integrated into the control system described above. The control system calculates positioning information from part configuration information and welding head position generated at the end of the weld cycle to control the flash removal system to accurately control the automated flash removal operation.

The machine 100 may further include an automated part loading system to provide automation of the complete part welding cycle. The system includes a part delivery system and an automated multi-axis pick and load arm. The part delivery system is loaded with the parts to be welded to the base plate in the order in which they are to be welded. The system automatically indexes each part to a pick-up station. The arm picks up each part and delivers it to the welding head. The part delivery system is a free standing indexing table that is manually loaded by the operator. The arm is servomotor driven with X-, Y-, and Z-axes of movement. A part gripper is attached to the end of the arm. The arm assembly may be mounted to the gantry support frame. In operation, the gripper moves from a parked position to the part delivery station and grips the next part to be welded. Using position feedback information from the control system, it positions the part inline with the welding head's clamping jaws and loads it into the jaws. When the welding head clamps the part the gripper releases the part and returns to the parked position. The cycle then repeats until all parts have been welded in place.

Figure 2:
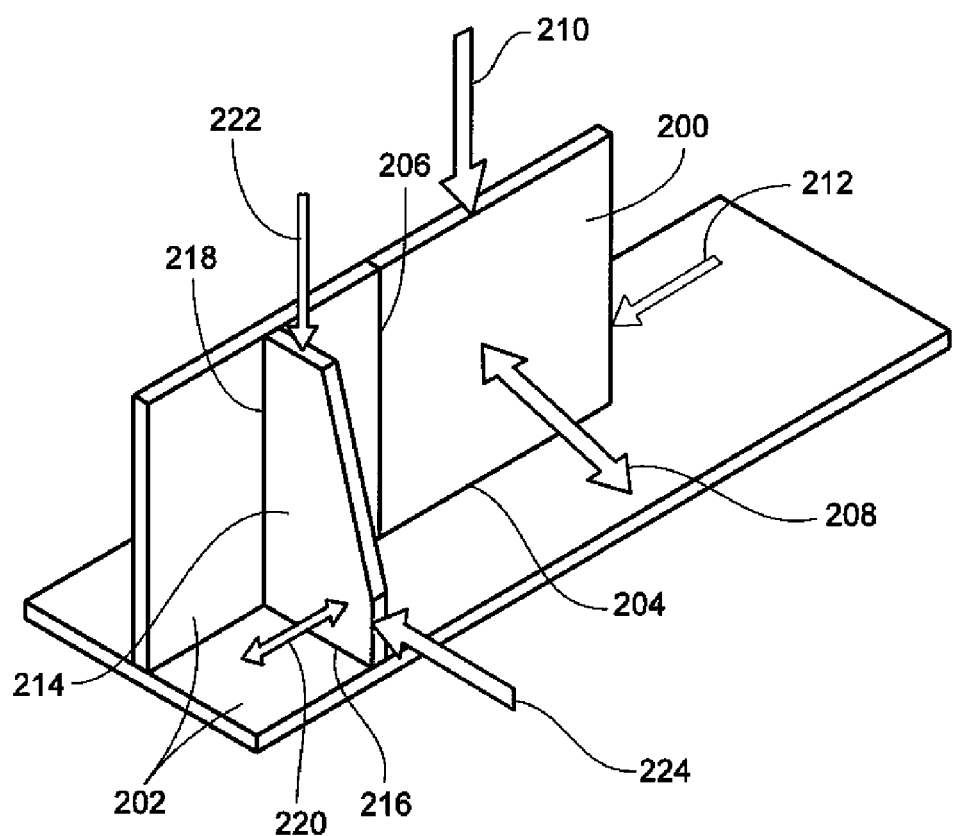
FIG. 2 is a schematic view showing sequential, dual axis linear friction welding process steps according to an embodiment of the invention.

Referring to FIG. 2, dual axis linear friction welding process steps performed by dual axis forging apparatus and methods according to the present invention are shown. In a first process in which right angle plate welding is shown, plate 200 is welded to base plate 202 at first horizontal base plate weld interface 204 and second vertical weld interface 206. The oscillation of plate 200 occurs along oscillation axis 208. The first forge load 210 for performing the base plate weld 204 is applied substantially perpendicular to the horizontal portion of plate 200, shown along the Z-axis. The second forge load 212 for performing the vertical weld 206 is applied substantially parallel to the horizontal portion of plate 200. In this weld, the two weld edges of welds 204 and 206 are of substantially equal length, and therefore the forge load applied in each axis is about equal in magnitude.

Still referring to FIG. 2, in a second process in which gusset plate welding is shown, plate 214 is welded to base plate 202 at first horizontal base plate weld 216 and second vertical weld 218. The oscillation of plate 214 occurs along oscillation axis 220. The first forge load 222 for performing the base plate weld 216 is applied substantially perpendicular to the horizontal portion of plate 200, shown along the Z-axis. The second forge load 224 for performing the vertical weld 218 is applied substantially parallel to the horizontal portion of plate 200. In this second exemplary welding scenario, the length of the vertical weld 218 is substantially greater than the length of the horizontal weld 216, and therefore the second forge load 224 has a greater magnitude corresponding to the weld length difference. For example, a first weld having a length three times greater than a second weld would require a forge load along its forge axis about three times greater in magnitude. The precise control available practicing the method of the present invention results in improved reliability in weld quality. In both welding scenarios, the first forge axis and the second forge axis are carried on the welding head and act at differing angles in relation to each other.

In welds in which the weld plane is not substantially perpendicular to the first or second forge axis, the forge axes nevertheless act at right angles to each other, and accurate control of the forge load on the angled surface is achieved through dual axis forge control. The amount of force applied to the first and second forge loads is calculated based on the angle of the weld interface with respect to the forge axes and the length of the weld interfaces. The calculation can be used to determine the resultant forge load contributed by the first forge axis, for example, the Z-axis. This value is then subtracted from the required forge load perpendicular to the angled welding plane. To complete the calculation, the resulting value is used to determine the additional forge load required in the X-axis to attain the resultant forge load to properly complete the weld in the angled plane. For this case, control software automatically sets the welding head parameters based on the part geometry inputs.

Figure 3:
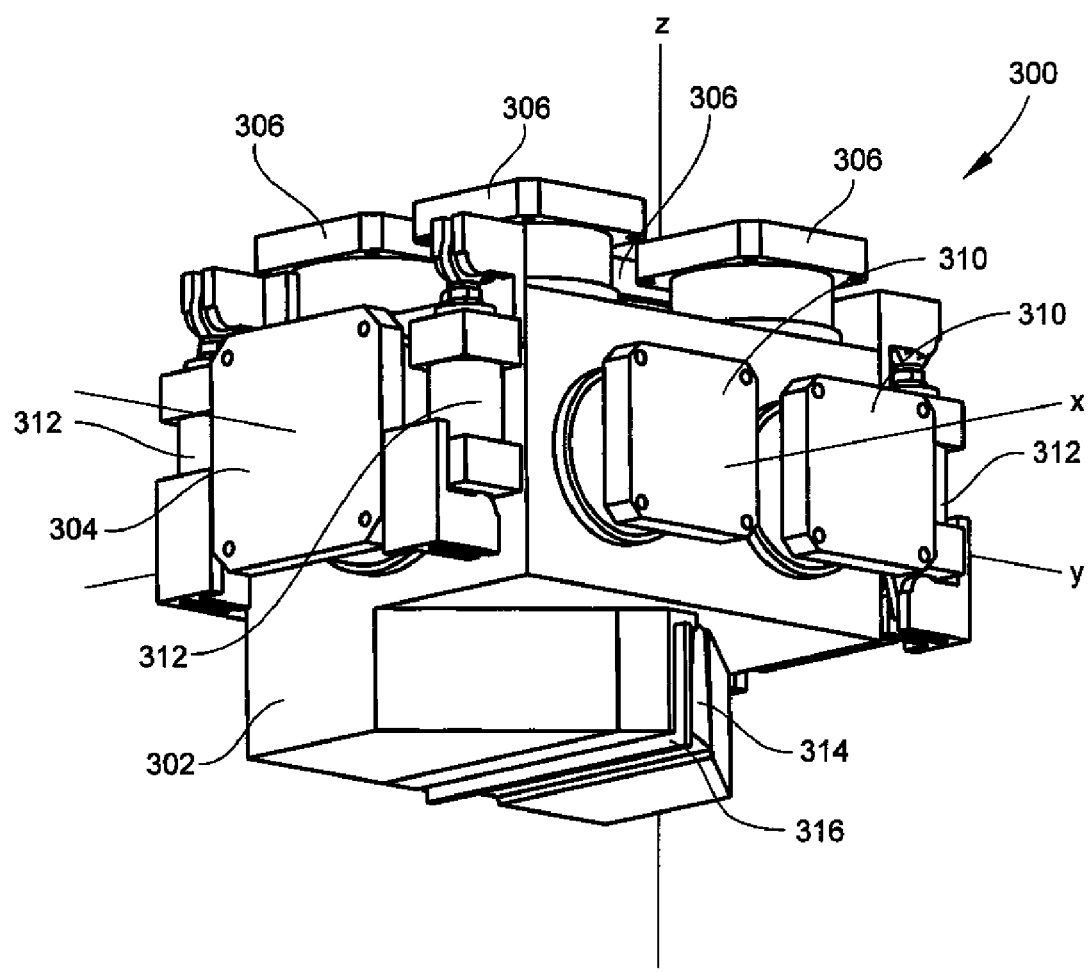
FIG. 3 is a bottom perspective view of a linear friction welding head for dual axis forging.
Figure 4:
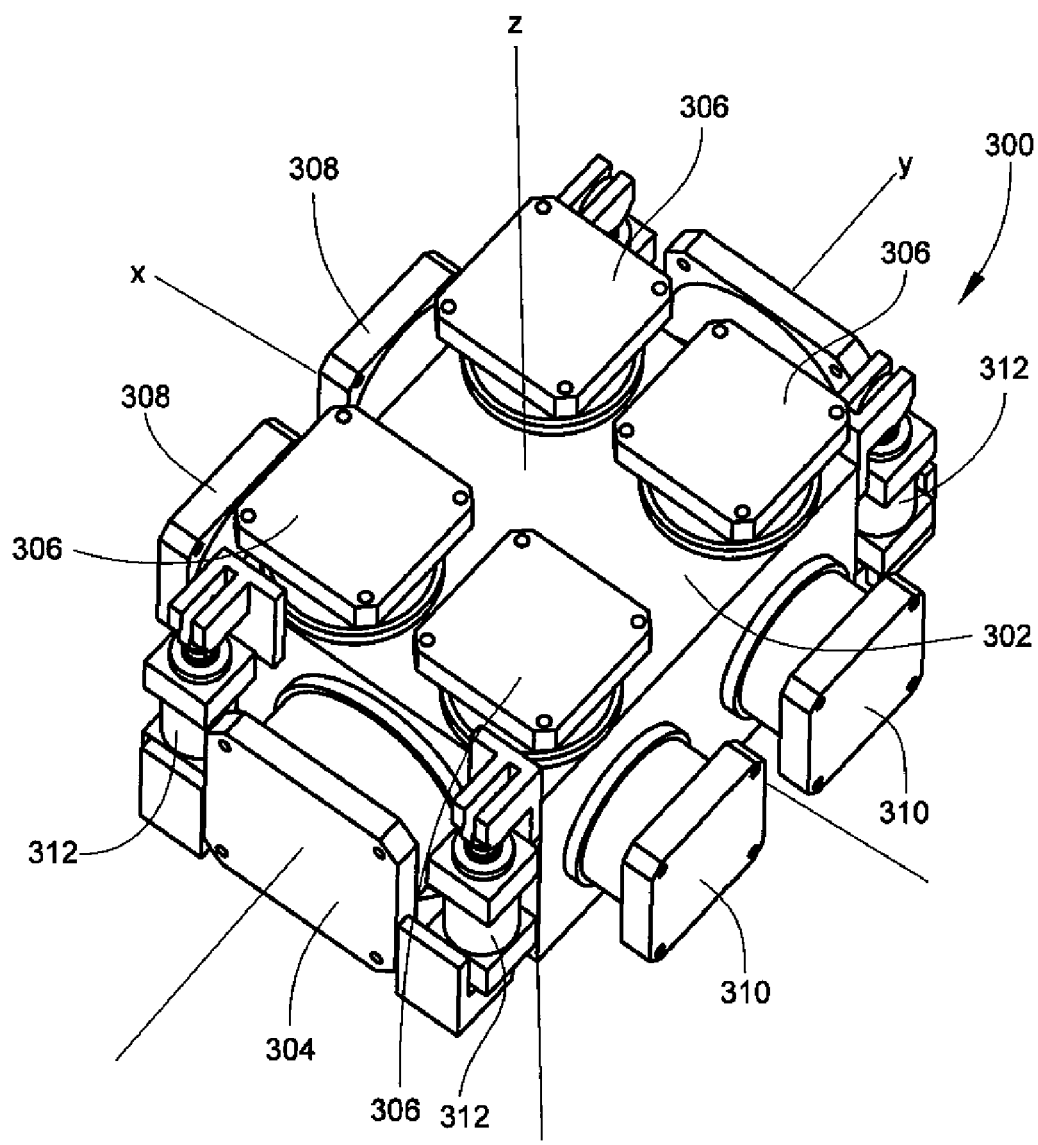
FIG. 4 is a top perspective view of the linear friction welding head of FIG. 3.

Referring to FIGS. 3 and 4, a linear friction welding head 300 for dual axis forging according to the methods of the present invention is shown. The linear friction welding head 300 is operable for providing the oscillation and forge loading forces that produce the welds. The welding head 300 includes an oscillation block 302 for supporting other components. Two (2) Y-axis oscillation hydrostatic bearing actuators 304 are provided on opposite lateral sides of the oscillation block 302 and are supported therein. Four (4) Z-axis forge hydrostatic bearing actuators 306 are provided on a top surface of the oscillation block 302 for providing the forge load along the first forge axis, the Z-axis. Two (2) X-axis hydrostatic forge actuators 308 are provided along one lateral side of the oscillation block 302 for providing forge load along the second forge axis, the X-axis. Two (2) X-axis counter-load hydrostatic bearing actuators 310 oppose the two (2) X-axis hydrostatic forge actuators 308 for countering the forge load of the X-axis forge actuators 308. Four (4) Z-axis counter-load floating cylinders 312 are positioned about each corner of the oscillation block 302 for countering the load of the Z-axis forge actuators 306.

The oscillation block 302 further provides the mounting surface for a clamping tool 314 for clamping oscillated part 316. The oscillation block 302 is maintained between the Y-axis hydrostatic oscillation actuators 304, the hydrostatic forge and counter-load actuators in the X-axis, 308 and 310, and the hydrostatic forge actuators and counter load cylinders in the Z-axis, 306 and 312. Each of the plurality of hydrostatic actuators are preferably equipped with servo-valves, for actuation, and pressure and position feedback sensors. The hydrostatic oscillation actuators are preferably provided with an accelerometer for velocity feedback.

Figure 5:
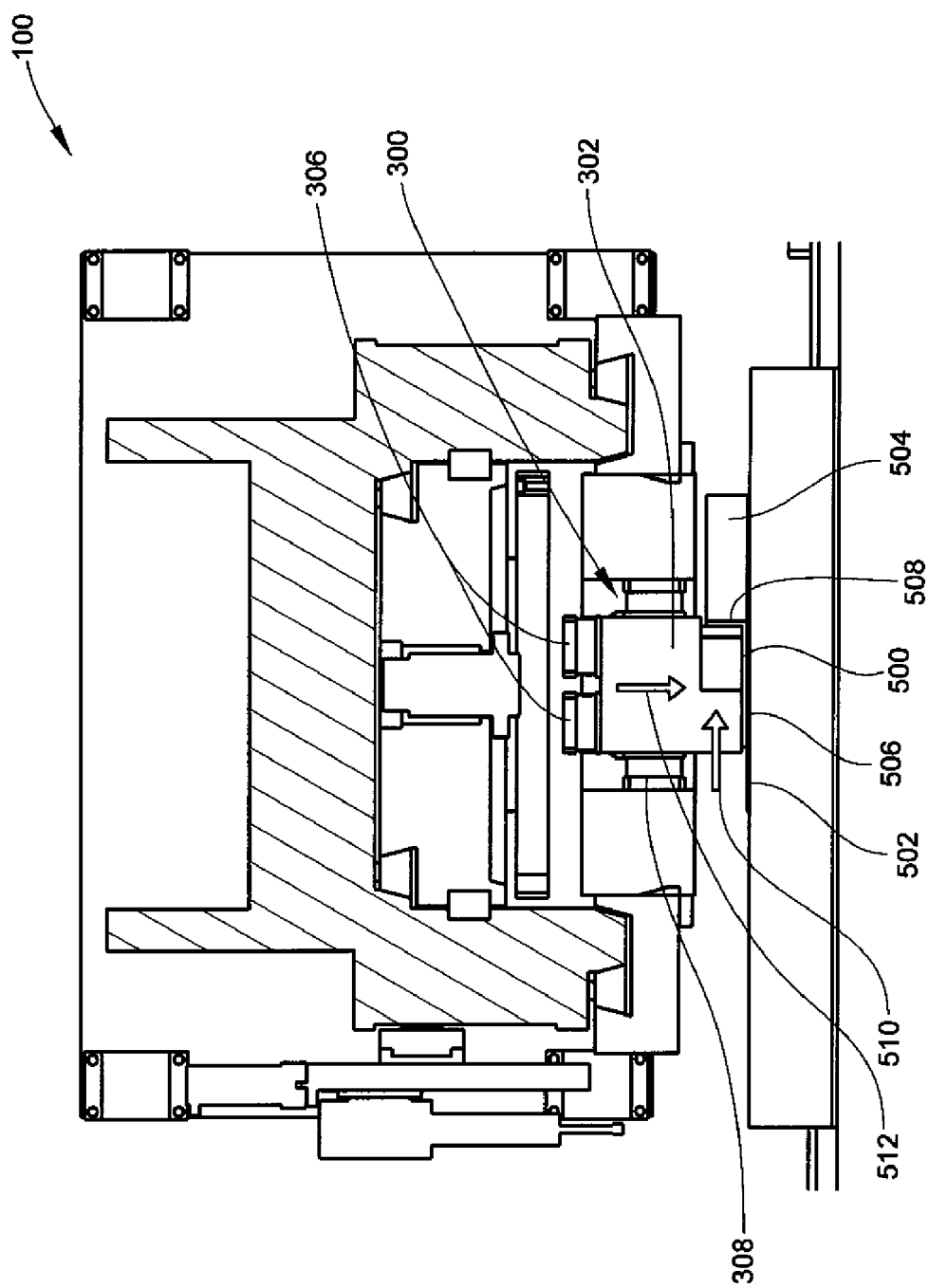
FIG. 5 is a cross-section of FIG. 1 taken through the welding gantry and welding head.

Referring to FIG. 5, the linear friction welding head 300 shown in FIGS. 3 and 4 is shown installed and maintained within a linear friction welding machine, such as the machine 100 of FIG. 1. In operation, each axis of the welding head 300 is controlled using servo-valves with pressure and position feedback. The oscillation block 302 is mounted in the welding head housing between the three sets of actuators. As shown, the base plate 502 and plate 504 have been previously welded together at weld plane 506 using Z-axis forge loading only. Plate 500, clamped in the welding head, is in contact at weld planes 506 and 508. As shown, plate 500 is to be right angle welded to base plate 502 and plate 504 along weld plane 506 and weld plane 508. The X-axis forge actuators 308 provide a forge load along the X-axis forge axis direction 510. The X-axis counter load and hydrostatic bearing actuators 310 provide the counter load force to develop the required preload on the hydrostatic bearings in the X-axis. This arrangement restrains the oscillation block 302 in the X-axis while allowing the forge actuators 308 to position and maintain control in the X-axis with no load applied to the welding head.

The Z-axis forge actuators 306 provide a forge load along the Z-axis forge axis direction 512. Again, a preload is required for the hydrostatic bearings that are integral to the hydrostatic actuators. The Z-axis counter load cylinders 312, see FIGS. 3 and 4, provide a force to counter load the oscillation block's weight and the hydrostatic forge actuators' preload to retain the oscillation block 302 in the welding head housing. This arrangement allows the hydrostatic forge actuators to control position in the Z-axis with no load applied to the welding head 300. The combined movement of any two sets of actuators provides one plane of motion. The three sets of orthogonal actuators result in three planes of welding head movement. The hydrostatic oscillation actuators provide high-frequency reciprocating Y-Axis movement of the head. In referring to FIG. 5, the oscillation axis is in the direction outwardly from the page.

Generally regarding the dual axis forging welding process, with the oscillation block in movement, preset (conditioning) forge loads are applied in the Z-axis and X-axis directions from zero to ninety degrees relative to the weld interfaces, preferably substantially perpendicular. With the oscillation motion and the loads applied, the resulting friction heats the weld interfaces to the plastic state of the material. Material is expelled from the weld interfaces, thereby cleaning the weld surface. Each forge axis displacement is monitored by the control system to determine the amount of material displaced, i.e., consumed, during the cleaning process. When the preset cleaning displacement is reached, the oscillation amplitude is reduced to zero to position the part for the final forge motion. At or near zero oscillation, the preset final forging load is applied in the Z- and X-axis directions. The applied forge loads force the parts together. The forge loading pressure is held constant. The forge displacement is monitored and recorded. As the material cools and solidifies the forge displacement stops. The forge load is maintained for a preset time after the forge displacement stops to ensure part positioning and weld quality. The final welding head position is recorded, the forge pressure is reduced to zero, the part clamp is released and the welding head retracted, thus completing the welding cycle.

Figure 6A:
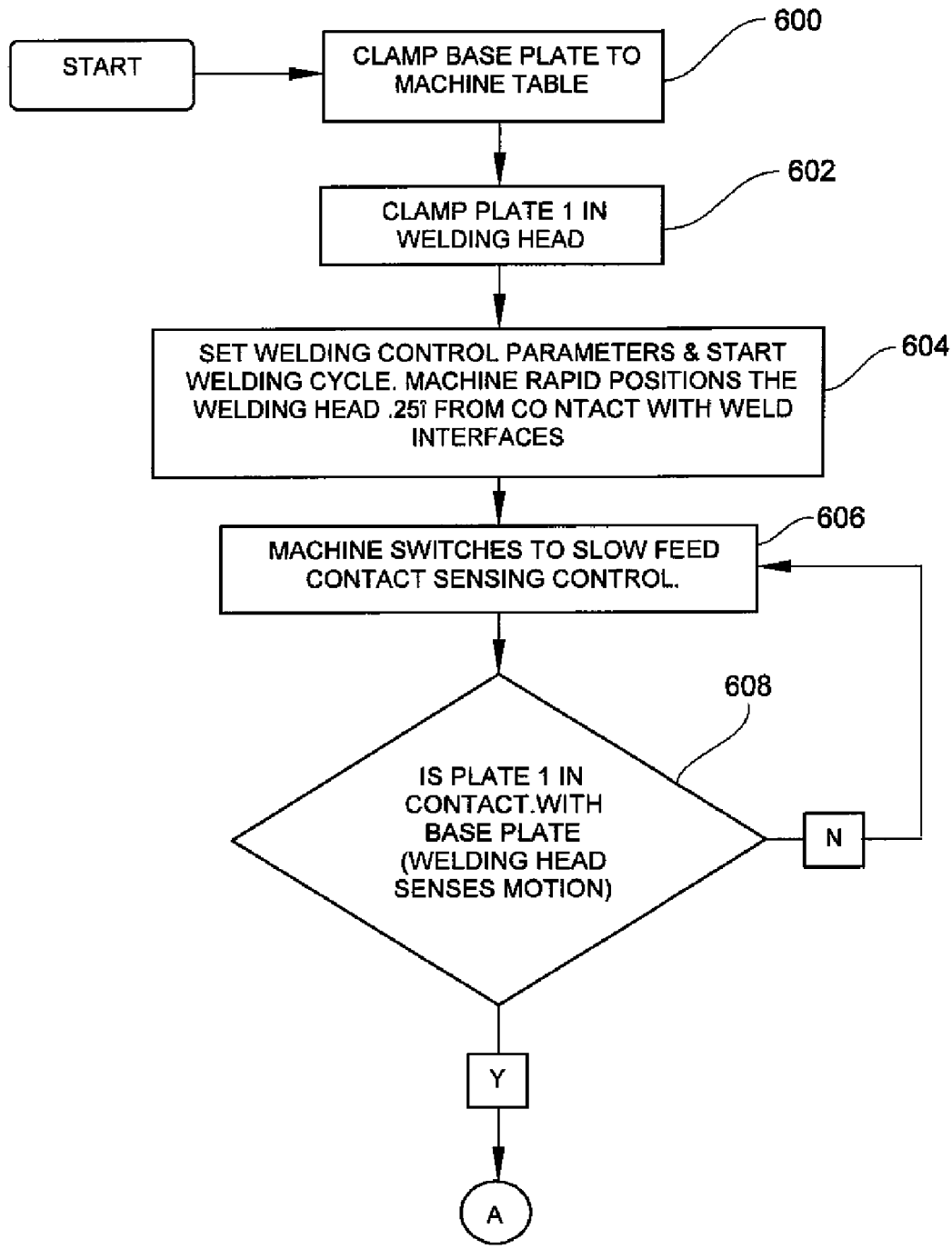
FIGS. 6A-6C are flow diagrams of a linear friction welding process according to an embodiment of the invention.
Figure 6B:
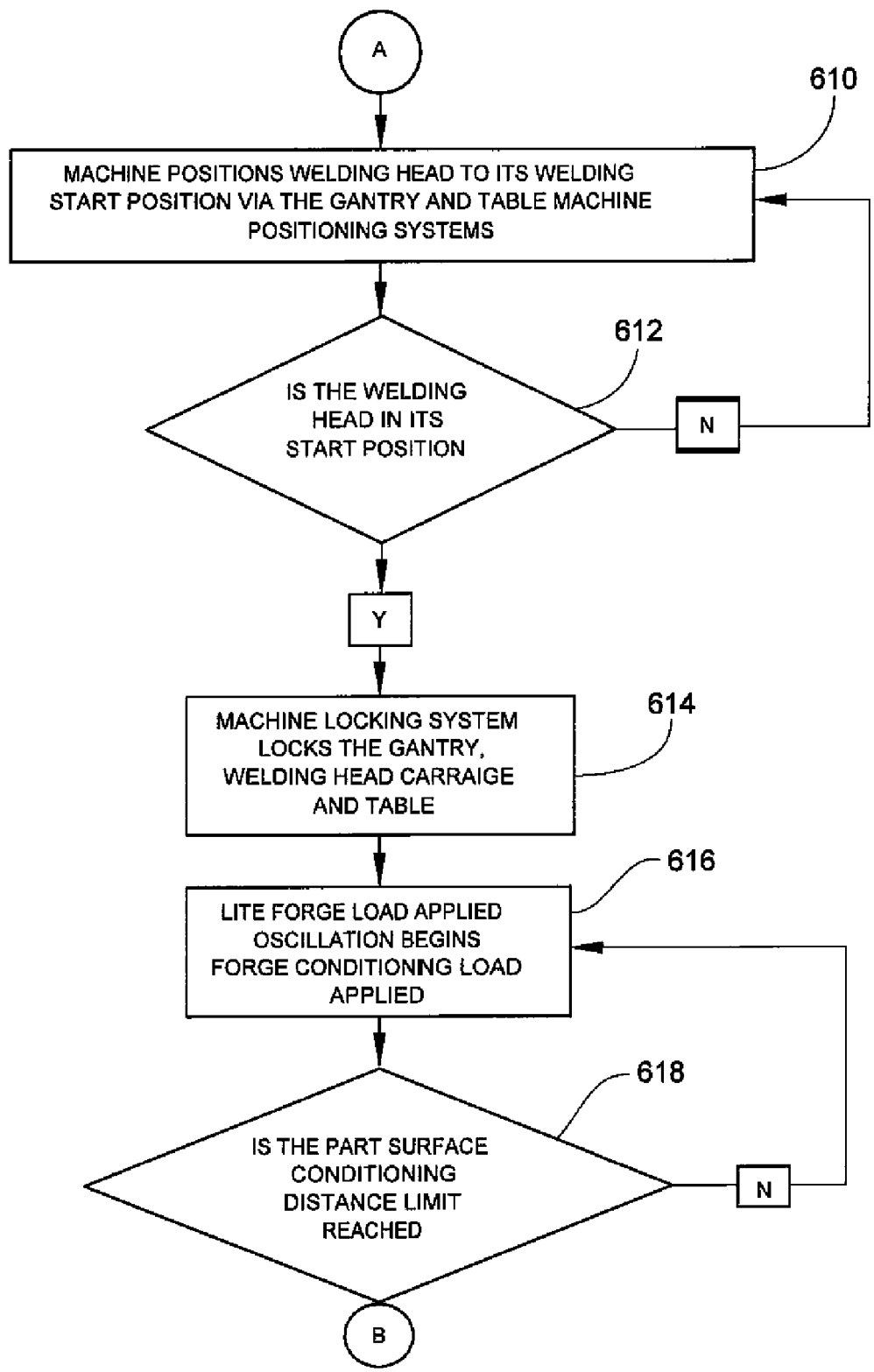
Figure 6C:
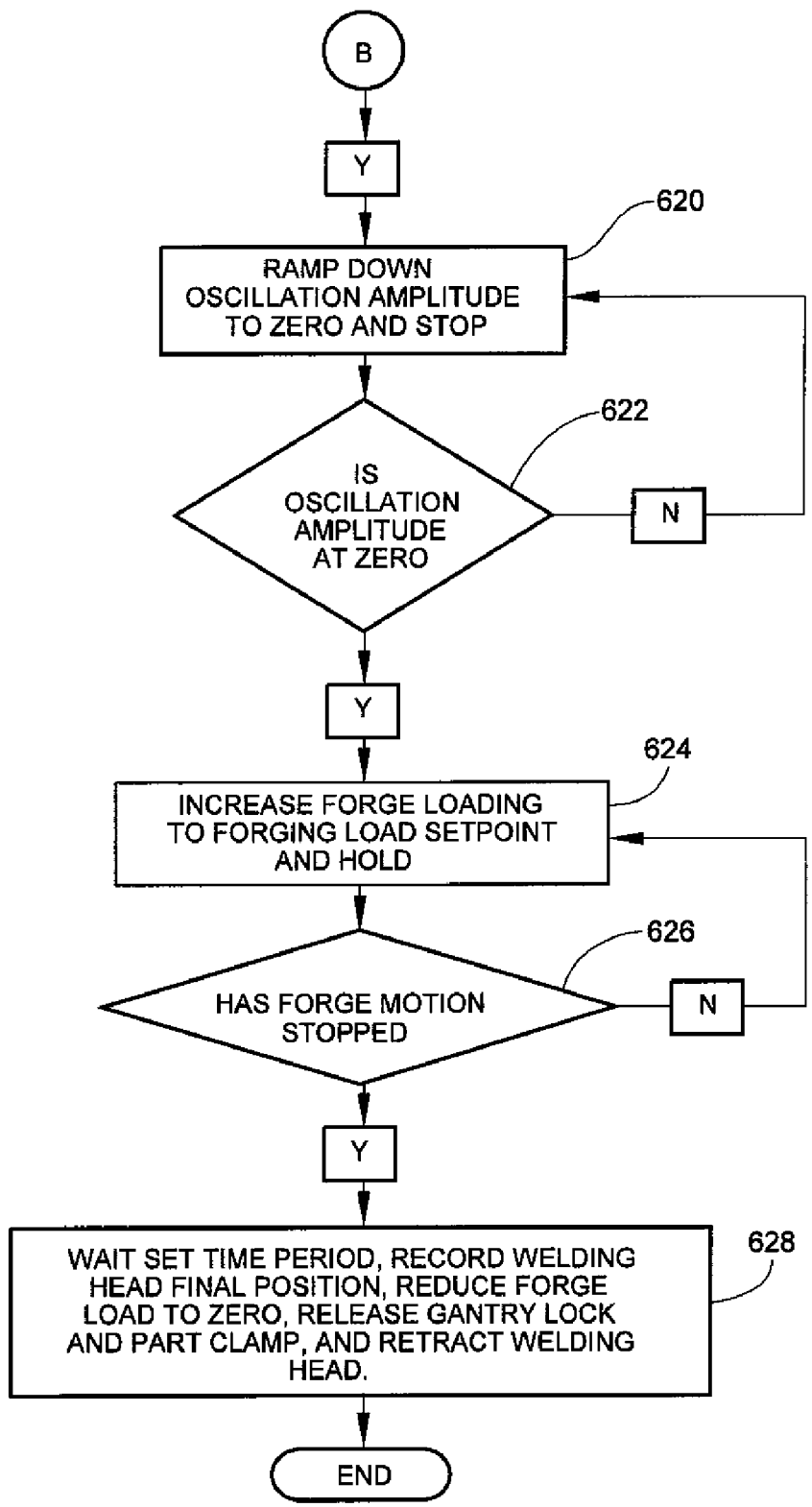

Referring to FIGS. 6A-6C, flow diagrams for a specific linear friction welding process utilizing dual axis forging according to an embodiment of the present invention are shown. The initiation of the process begins with the loading of the base part onto the linear friction welding machine (Step 600) and the clamping of the plate to be welded to the base part within the clamping feature of the oscillation block (Step 602). Welding control parameters are then determined, set and the welding cycle started (Step 604). In the start of the welding cycle, the machine rapidly positions the welding head a predetermined distance from contact with the weld interfaces. Next, the machine switches to slow feed contact control (Step 606). A query is made to determine if the plate to be welded to the base plate is in proper contact with the base plate through welding head sensing motion (Step 608). If it is determined that proper contact has not been made then the process repeats the slow feed contact sensing control step. If it is determined that proper contact has been made, the next step in the process is for the machine to position the welding head to its start position via the gantry and table machine positioning systems (Step 610).

A query is then made to determine if the welding head is in the start position (Step 612). If it is determined that the welding head is not in the start position then the process of positioning the welding head is repeated. If the welding head is in the proper start position, the machine locking system locks the gantry, welding head carriage and table (Step 614). To weld the parts, the forge loads are applied, oscillation begins and the forge conditioning loads are applied (Step 616). A query is then run to determine if the part surface conditioning distance has been reached (Step 618). If it is determined that the distance limit has not been reached, applying the forge load and oscillation are repeated. If it is determined that the distance limit has been reached, the oscillation amplitude is ramped down to zero and stopped (Step 620). A query is then run to determine if the oscillation amplitude has reached zero (Step 622). If it is determined that the oscillation amplitude has not reached zero, the oscillation amplitude is reduced to zero and stopped. If it is determined that the oscillation has reached zero, the forge loading is increased to a forging load set-point and held (Step 624). A query is then run to determine if the forge motion has stopped (Step 626). If it is determined that the forge motion has not stopped, the forge load continues to be applied at the set point value and continues. If it is determined that the forge motion has stopped, the stop point is held for a predetermined time period, and the welding head final position is recorded, the forge load is reduced to zero, the gantry lock and part clamp are released, and the welding head is retracted (Step 628). The weld process has been completed. The process may then be repeated for the second or next plate.

Figure 7E:
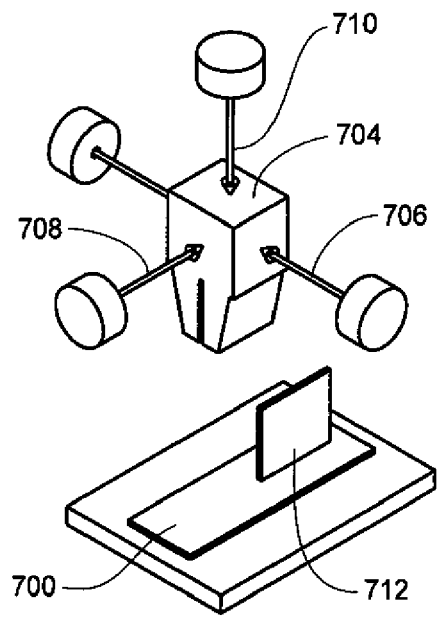

The systems and methods of the present invention may be used to produce single interface and multi-interface welds. Referring to FIGS. 7A-H, various views of a simplified schematic sequence of operation of a linear friction welding machine for welding are shown. Referring to FIG. 7A, in Step 1, the base plate 700 is mounted to the table 702. The welding head 704 provides Y-axis oscillation 706, X-axis forge 708 and Z-axis forge 710. Referring to FIG. 7B, in Step 2, the base plate 712 is clamped into the welding head 704. Referring to FIG. 7C, in Step 3, the weld head 704 positions part 712 and performs a linear friction weld along a single plane with only the Z-axis forging 710 active. Referring to FIG. 7D, in Step 4, the weld is completed and the weld head retracted.

Figure 7F:
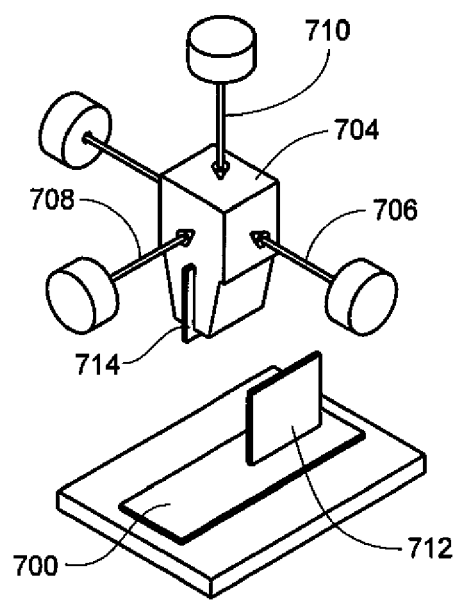
Figure 7G:
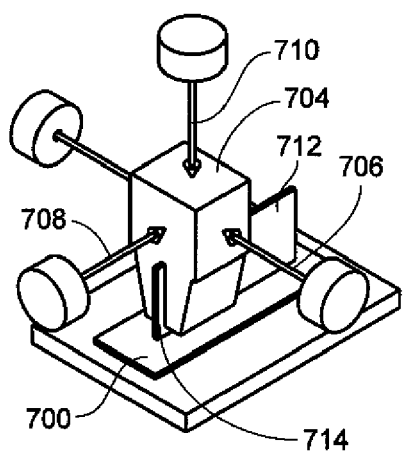
Figure 7H:
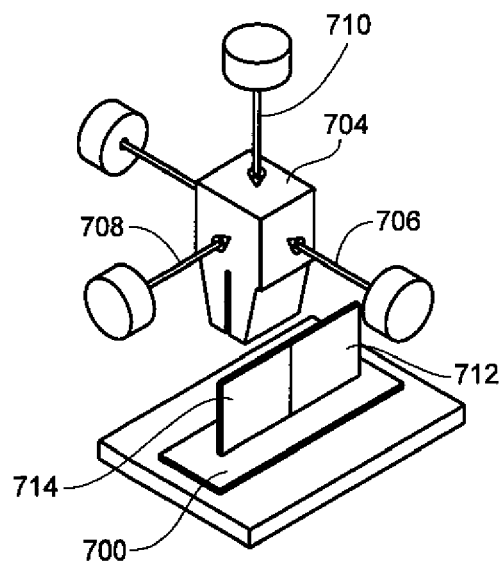
Figure 8:
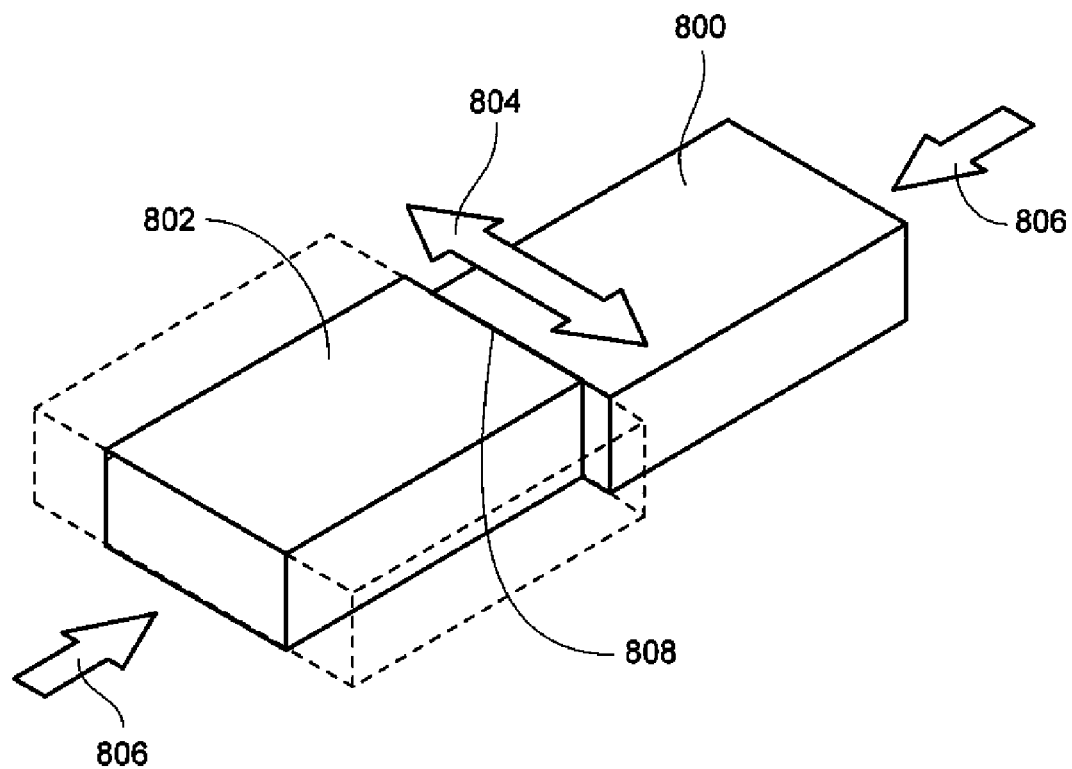
FIG. 8 is a schematic view showing a prior art linear friction welding process step.
Figure 9:
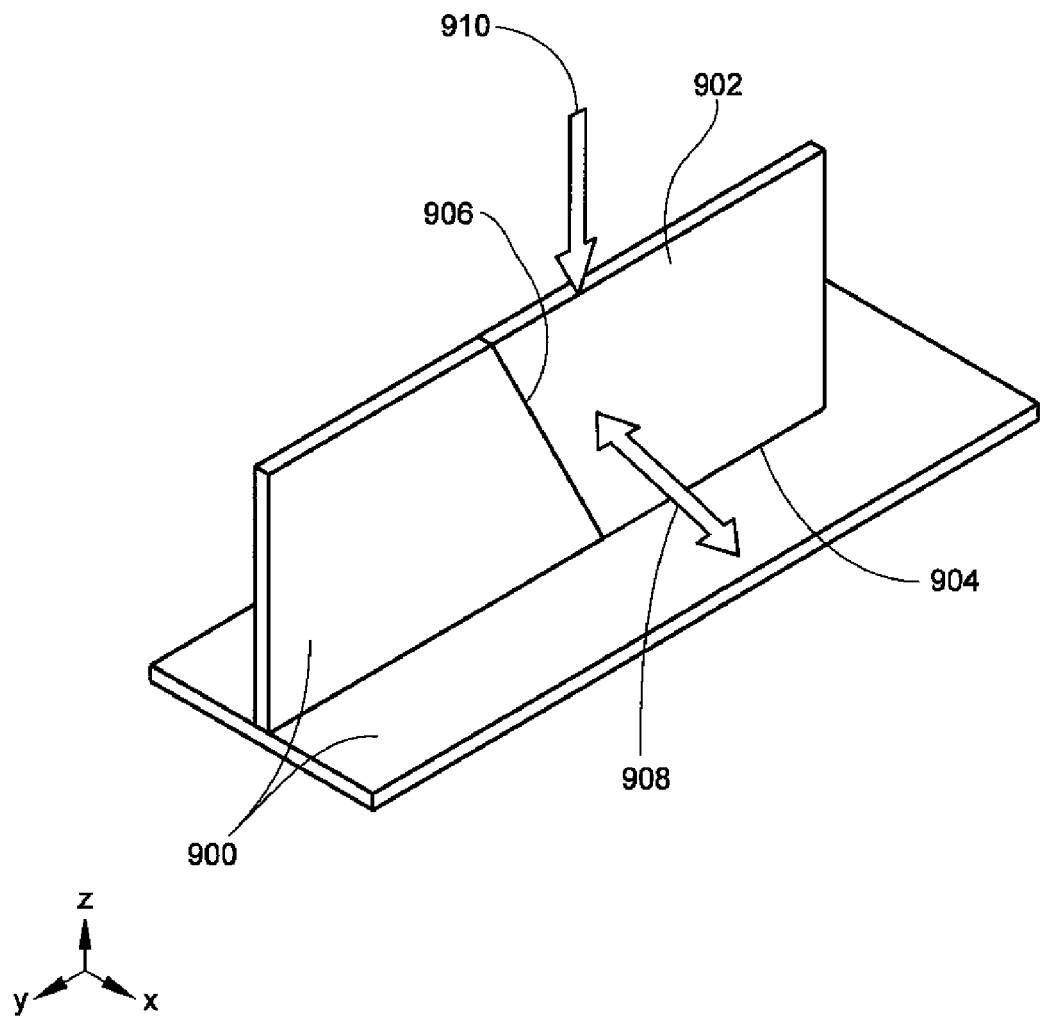
FIG. 9 is a schematic view showing a prior art single axis linear friction welding process step.

Referring to FIG. 7E, in Step 5, the weld head 704 is positioned for the next weld. Referring to FIG. 7F, in Step 6, a second plate part 714 is loaded into the welding head 704. Referring to FIG. 7G, in Step 7, the weld head 704 positions the second part 714 and performs a linear friction two-plane weld with the Z-axis 710 and X-axis 708 forging active. Oscillation occurs along the Y-axis 706. Referring to FIG. 7H, in Step 8, the weld head 704 is retracted and the two-plane weld is complete with plate part 714 welded along one interface to plate part 712 and one interface to base part 700.

Operating parameters are not believed to be significantly different from single axis linear friction welding techniques. By way of example only, oscillation frequency of the welding head may be between about 25 Hz to 100 Hz, with ranges of between 25 Hz-45 Hz and 40 Hz to 60 Hz being typical, depending on material, material thickness, part application and similar variables. Forging pressure may be approximately 14,000 psi, again depending on material, material thickness, part application and similar variables. The welding angle will often be 90 degrees, but other relative angles may be achieved with the apparatus and methods of the present invention.

While dual axis forging linear friction welding apparatus and methods are described above, various details of the invention may be changed without departing from the scope of the invention. Furthermore, the foregoing description of the preferred embodiment of the invention and best mode for practicing the invention are provided for the purpose of illustration only and not for the purpose of limitation.

What is claimed is:

1. A method for dual axis forging linear friction welding, the method comprising:
    providing a linear friction welding apparatus comprising a welding head apparatus including three sets of orthogonal actuators for providing X-, Y-, and Z-planes of welding head apparatus movement for providing Y-axis oscillation, a first forge load along a Z-axis forge axis, and a second forge load along an X-axis forge axis;
    providing a base plate;
    providing a part to be welded to the base plate at a first weld interface and a second part at a second weld interface;
    applying the first forge load at an angle relative to the first weld interface and the second forge load at an angle relative to the second weld interface, the first and second forge loads having predetermined magnitudes;
    oscillating the part along the Y-axis at a predetermined oscillation amplitude to heat the part and the base plate;
    reducing the oscillation amplitude to zero;
    increasing the first and second forge loads to predetermined set-points and maintaining for a predetermined period of time;
    reducing the first and second forge loads to zero;
    wherein the welding head apparatus comprises:
    an oscillation block having opposing lateral sides;
    at least one Y-axis oscillation actuator supported on at least one of the opposing lateral sides of the oscillation block;
    at least one Z-axis forge actuator supported by the oscillation block for providing the first forge load;
    at least one X-axis forge actuator supported by the oscillation block for providing the second forge load;
    at least one X-axis counter-load actuator supported by the oscillation block for countering the second forge load; and
    at least one Z-axis counter-load floating cylinder supported by the oscillation block for countering the first forge load.

2. The method according to claim 1, wherein the angle of the first forge load relative to the first weld interface and the angle of the second forge load relative to the second weld interface range from zero to ninety degrees.

3. The method according to claim 1, wherein the angle of the first forge load relative to the first weld interface and the angle of the second forge load relative to the second weld interface are both substantially perpendicular.

4. The method according to claim 1, wherein the amplitudes of the first and second forge loads correspond to the length of the weld interface.

5. The method according to claim 1, wherein the X- and Z-forge axes act at right angles to each other.

6. The method according to claim 1, further comprising monitoring material displacement during welding to determine when to reduce the oscillation amplitude to zero.

7. The method according to claim 1, further comprising monitoring and recording forge displacement.

* * * * *